June 23, 1970 — A. HATKEVICH — 3,516,565
CAP GASKETED METAL CLOSURE
Filed July 10, 1967
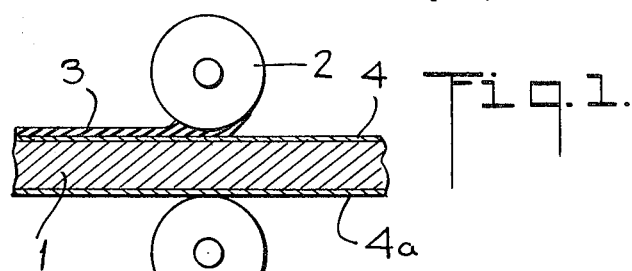
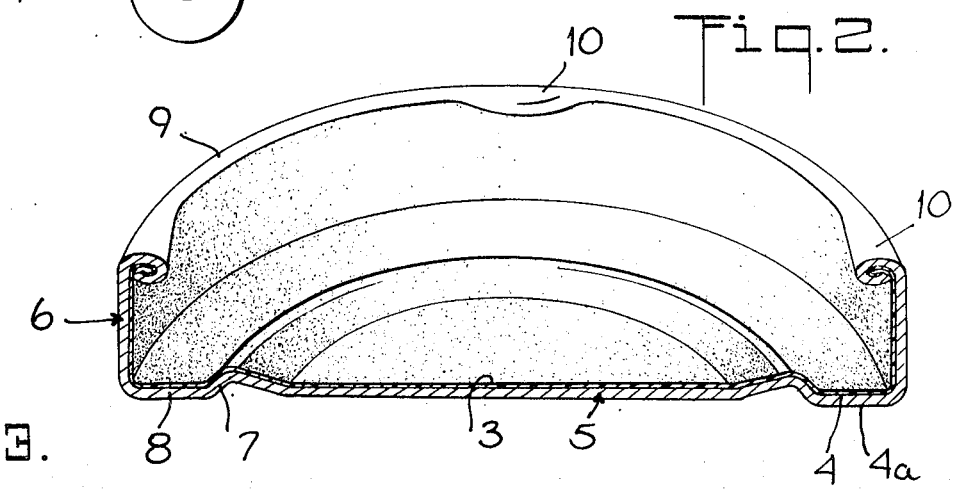
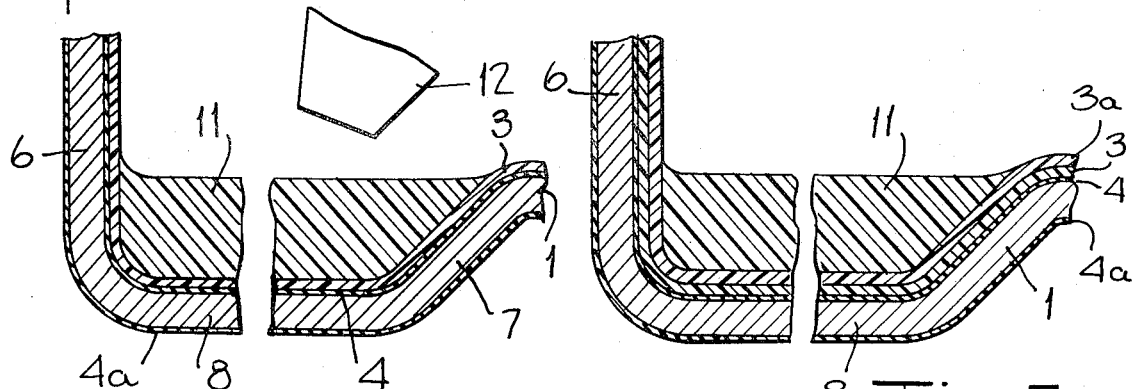
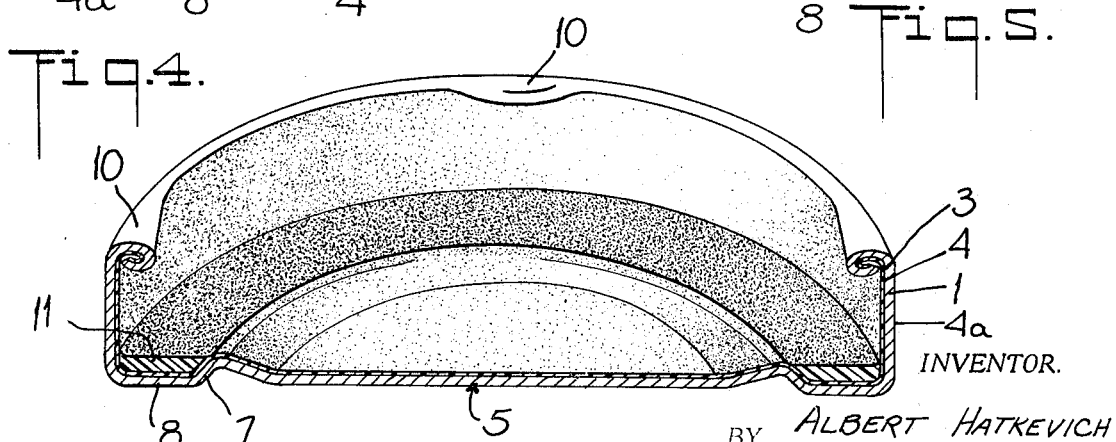
INVENTOR.
ALBERT HATKEVICH
BY
ATTORNEY

United States Patent Office 3,516,565
Patented June 23, 1970

3,516,565
GASKETED METAL CLOSURE CAP
Albert Hatkevich, Lancaster, Ohio, assignor to Anchor Hocking Corporation, Lancaster, Ohio, a corporation of Delaware
Filed July 10, 1967, Ser. No. 652,353
Int. Cl. B44d 1/14; B32b 15/08; B65d 41/00
U.S. Cl. 215—40
3 Claims

ABSTRACT OF THE DISCLOSURE

Closure caps are prepared by coating a metal substrate with a solution of a high molecular weight vinyl resin, drying the adhesive solution, and bonding thereto a plastisol.

Background of the invention

Closure caps are utilized in large quantities for sealing containers for various types of products. These caps, ordinarily made of metal such as tin-plate, have protective coatings applied to the inner surface, either on the metal itself or a primer thereon. In the past, the degree of protection afforded by such coatings has been limited, and frequent instances of solvation and degradation of the coatings as well as corrosion of the underlying metal have occurred. Failure to provide adequate protection has been traced to impaired adhesion between such coatings and material placed thereon to form a sealing gasket. This may result at least in part from migration of plasticizer used in the gasket into the underlying coating causing degradation thereof. The detrimental effect of such migration may also be exhibited by the interface of the metal substrate and any primer thereon.

Accordingly, it is an object of the present invention to provide a closure cap which minimizes exposure of small areas of the metal thereon and the resulting corrosion.

Another object of the present invention is to minimize or prevent pinholing of closures of sealed packages resulting from electrolytic and chemical attack on small areas thereof.

Another object of the invention is to prevent the inner edge of the sealing gasket from loosening and forming objectionable pockets or cavities.

Another object of the invention is to provide a thin coating of a solution coating composition capable of producing a coating composition which exhibits improved plastisol adhesion.

Another object of the invention is to provide a closure cap having a solution coating composition capable of producing a coating which maintains plastisol adhesion under conditions of elevated temperature and pressure.

Still another object of the invention is to provide a closure cap having a solution coating composition capable of producing a coating which exhibits improved adhesion with plastisols and improved intercoat adhesion with a metal substrate or primer thereon.

Yet another object of the invention is to provide a method of making an improved closure cap utilizing a solution coating composition.

Other objects of the invention will in part be obvious and in part appear hereinafter in the detailed description of the invention and in the drawing.

Summary of the invention

It has now been found that improved closure caps may be prepared by a method which comprises coating one side of a metal sheet with a solution of a high molecular weight vinyl resin consisting essentially of polyvinyl chloride in an easily evaporatable solvent, evaporating the solvent from the solution to form a coating of vinyl resin, fabricating the sheet into at least a partially formed closure cap with the coating on the inside, flowing a plastisol gasket material into the inside of the closure to form a gasket, and heating the closure cap to cure the plastisol gasket and to bond the plastisol gasket to the coating of vinyl resin.

The metal sheet may be any material normally used or capable of being used to form a closure cap.

The high molecular weight vinyl resin comprises about 97% by weight polyvinyl chloride. The high molecular weight vinyl resin is applied to the metal sheet in the form of a solution containing up to about 20% by weight of the high molecular weight vinyl resin in an easily evaporatable solvent. The plastisol comprises polyvinyl chloride, or copolymers of vinyl chloride and vinyl acetate, in a plasticizer, no solvent being present.

Detailed description

Essentially, the solution coating compositions comprise a high molecular weight vinyl resin consisting essentially of polyvinyl chloride dissolved in a suitable solvent. The resin should contain about 97% polyvinyl chloride. A suitable resin is a composition containing about 97% by weight polyvinyl chloride and about 3% by weight polyvinyl acetate. A specific example of such a resin is Bakelite VYNW. The solutions may contain up to about 20% by weight resin, the balance being solvent. The solvent is not limited to any particular compound and may include mixtures. Functionally, the solvent should not only be capable of dissolution of the high molecular weight vinyl resin but also be capable of providing a high solids ratio, i.e., part by weight of dissolved resin to part by weight of solvent. In addition, the vapor pressure characteristics of the solvent should be such that a practical rate of evaporation is obtained for the particular coating application employed. By way of illustration, in the case of a high molecular weight vinyl resin, such a vinyl chloride-vinyl acetate copolymer, a particularly effective solvent is a mixture of isophorone and cyclohexanone in a 1:1 weight ratio. The resultant solution provides a high solids ratio of 6–12% by weight and a practical rate of evaporation for a method of application such as roller coating and baking.

Optionally, the solution coating compositions may be modified by additions such as adhesive promoters, stabilizers, plasticizers and pigmentation agents to provide coatings exhibiting characteristics peculiarly adapted to given applications. For example, an adhesive promoter such as a ketone-formaldehyde resin or a phenolic resin may be added to promote intercoat adhesion with a metal substrate or primer thereon. The ketone-formaldehyde resin is desirably employed in a range of 15–25% based on total vehicle solids whereas the phenolic resin is desirably used in a range of 10–50% based on total vehicles solids. The maximum values are dictated in the case of ketone resin by loss of plastisol adhesion and in the case of phenolic resin by extreme darkness of buff color. Where processing conditions demand even greater intercoat adhesion, additions of a material such as Silane A–1100 in a concentration of about 0.1 to 1.1% based on total vehicle solids has proven successful. Silane A–1100 is a trademark of Union Carbide and comprises γ-aminopropyltriethoxysilane. Depending on the amount and type of baking to which the coating compositions will be subjected, as for example occurs in the course of closure cap manufacture, it may be advisable to effect a desired stabilization and plasticization by the introduction of a stabilizer or plasticization by the introduction of a stabilizer or plasticizer additive, such as an epoxy resin. The latter has been used successfully in the 10–15% range based on total vehicle solids. Desired coloring may be imparted to the coating by additions of a pigment. The minimum pigment concentration should be such that the coating application method employed is economically feasible while the maximum pigment concentration should not detract from the corrosion resistance of the coating produced.

While various methods may be employed in making the coatings of the invention, best results are obtained by dissolving the high molecular weight vinyl resin in a suitable solvent and thereafter dispersing desired pigment therein. Pigment may be dispersed in the vehicle by a number of grinding methods, including the use of pebble mills, 3-roll mills and sand mills. The pigment volume concentration range may vary depending on the degree on gloss desired although a range of 10–20% has been found suitable. All types of $TiO_2$ pigments have been found effective in the coatings but the rutile form is preferred over the anatase form of $TiO_2$ because of its superior gloss and opacity properties. Other additions, including adhesive promoters, stabilizers and plasticizers may be added to the base mix of high molecular weight vinyl vehicle and pigment in any order provided there is complete solubilization. Thus, such additions may be preliminarily put into solution by a proper solvent before being added to the base mix. Homogeneity is then effected by simply stirring. Depending upon the amount of solvent employed various viscosity levels may be obtained. In general, coating solutions having viscosities of 50–150 seconds useing a No. 4 Ford cup may be used with the roller coater method of application. At the lower end of the viscosity range, e.g., 50–60 seconds, excellent flow out and leveling properties are easily attained. However, higher viscosities permit more build in the coating with each pass.

Description of the preferred embodiments

In the course of the investigation leading to the present invention various adhesive solution coating compositions were prepared and tested. Illustrative of a method of preparation contemplated by the invention is the following:

An adhesive solution coating composition was prepared by dissolving 125 grams of vinyl chloride-vinyl acetate copolymer (such as that commercially known as Bakelite VYNW) in a blend of 550 grams of isophorone and 550 grams of cyclohexanone. A pigment comprising 100 grams of $TiO_2$ was dispersed in the vinyl vehicle by rolling in a pebble mill for a period of 72 hours. The pebble mill was then washed with 200 grams of a 1:1 weight blend of isophorone and cyclohexanone. An adhesive promoter comprising 30 grams of commercially known Mohawk ketone-formaldehyde resin MR–77 was dissolved in 50 grams of isophorone and added with stirring to the base mix of vinyl resin and pigment. A stabilizer comprising 15 grams of epoxy resin such as Union Carbide ERL–2774 standard epoxy resin was then dissolved in 15 grams of isophorone and the solution added together with 2 grams of commercial Silane A–1100 with stirring to the foregoing resultant mix.

The coating solution prepared as above was thereafter roller coated onto tinplate having an epoxy-phenolic resin type coating, such as Stoner-Mudge No. 5061 H, prime coat, and baked. The coated tinplate was formed into a closure cap and a plastisol material was flowed therein and baked to form a sealing gasket. Subsequent exposure of the coated closure cap to sterilization and processing conditions failed to occasion either plastisol separation or intercoat separation from the primer substrate, and no evidence of corrosion was observed. Sterilization conditions were simulated by a test conducted in a steam cabinet at a steam temperature of at least 300° F. for 30 minutes. Processing conditions were simulated by a test conducted in a retort at a temperature of 250° F. at 30 p.s.i. for a period of 60 minutes.

A number of additional coating solutions were prepared essentially as aforedescribed. The compositions of such solutions fell within the ranges of components set forth in the following table:

TABLE 1

| Component | Coating solution, percent | | |
|---|---|---|---|
| | A | B | C |
| High molecular weight vinyl resin, Bakelite VYNW | 50–90 | 50–95 | 50–95 |
| Ketone-formaldehyde resin, MR–77 | | 5–35 | 5–35 |
| Union Carbide phenol-formaldehyde baking resin BKE–2620 Silane A–1100 | 10–40 | | 0.1–1.1 |
| Stabilizer, ERL–2774 | 5–15 | 5–15 | 5–15 |
| $TiO_2$ | 10–20 | 10–20 | 10–20 |
| Isophorone | 35–45 | 35–45 | 35–45 |
| Cyclohexanone | 35–45 | 35–45 | 35–45 |

NOTE.—Percent values in all cases except $TiO_2$ and solvent are based on weight of vehicles solids. Percent $TiO_2$ is based on pigment volume concentration whereas percent solvent, i.e., isophorone and cyclohexanone is based on total weight composition.

Subjection of closure caps formed from metal coated with the solutions of Table 1 to the aforedescribed test conditions was attended by the successful maintenance of plastisol and intercoat adhesion as well as freedom from corrosion. Substitution of lower molecular weight vinyl resins for the high molecular weight resin used herein, or of a high molecular weight vinyl resin containing substantially less than about 97% vinyl chloride resulted in closure caps which failed to withstand these test conditions.

Description of the drawing

A preferred embodiment of the invention has been chosen for purposes of illustration and description and is shown in the accompanying drawings, forming a part of the specification, wherein:

FIG. 1 is a sectional view showing a coating being applied over a primer coating to a sheet of metal, such as tinplate;

FIG. 2 is a perspective sectional view showing the coated tinplate after it has been shaped into a closure cap;

FIG. 3 is a partial sectional view showing a plastisol gasket after it has been flowed into the closure cap channel and also showing the different coatings used to form a secure bond between the metal, the coating, and the gasket; and FIG. 4 is a perspective sectional view of the completed closure cap of the present invention.

FIG. 5 is a partial sectional view of another embodiment of the invention showing an additional coating between the metal and the gasket.

Plastisols are well known and are utilized for gaskets in closure caps. The general compositions of plastisols are given in Rubber Age, vol. 67, No. 5, August 1950, at pages 553 to 560.

Generally, a plastisol is made of resin pastes comprising polyvinyl chloride or vinyl copolymers in a plasticizer. Such plastisols will remain in a semi-liquid or pasty condition until they are heated sufficiently to permit the plasticizer to be diffused throughout the resin paste to form a rubber-like compound. This process is called "fluxing."

Referring more particularly to FIG. 1 of the drawings, the inner side of a metal 1, such as tinplate, is coated with a primer coating 4 to provide a secure bond between the tinplate and the adhesive solution coating 3 applied over the primer coating. This primer coating 4 may be the ordinary type of lacquer or enamel used for protecting closures against corrosion. One such primer which may be used is a so-called "T-Buff" which comprises an epoxy-phenolic type primer and a modified vinyl type buff coating, however, other primers may also be used if desired. The tinplate with the primer coating is baked in an oven at temperatures of about 400° F. to bond the primer securely to the tinplate.

The tinplate 1 with the primer coating thereon is then passed beneath a roller 2 which is adapted to apply an adhesive solution coating 3 on the sheet of tinplate 1 over the primer coating. The adhesive solution coating may be applied to the roller 2 by any well-known or conventional means such as an offset roller (not shown).

The roller 2 applies the adhesive solution coating 3 to the tinplate 1 and spreads the adhesive solution coating thinly over the primer coating. It has been found that adhesive solution coating thicknesses of between .0005" and .002" will protect the metal and will give a good bond between the adhesive solution coating and a plastisol gasket to be subsequently applied. Excellent results have been obtained with a coating thickness of .00075" but other thicknesses may be utilized.

After the tinplate is coated with the adhesive solution coating 3, it is preferably heated to temperatures of between 350° F. and 360° F. for about twelve minutes. Typical oven cycles which give good results are:

|  | Minutes |
|---|---|
| 350° F. | 5 |
| 360° F. | 5 |
| 360° F. | 2 |

This will evaporate the solvent in the adhesive solution coating and will cure the coating to permit it to become securely bonded to the primer coated metal.

The outer surface of the tinplate is generally coated with one or more coatings for protective and decorative purposes. The coating 4a on the outer surface may be applied first, if desirable to prevent excessive curing of the coatings on the inner surface.

The strip of tinplate 1 with its several coatings is thereafter shaped by suitable machinery into a closure, such as that shown in FIG. 2, comprising a cover portion 5 and a depending skirt portion 6.

The cover portion 5 has a shoulder 7 pressed downwardly toward the bottom of the cap in spaced relation to the skirt portion 6 to provide a gasket-receiving channel 8 in the cover. The edge of the skirt portion 6 is curled into a bead 9 from which a plurality of retaining lugs 10 are formed to lock the cap on the container. While the closure illustrated in the drawings is a so-called "hidden lug" twist cap, it will be understood that the present invention may be used in connection with other types of closures, such as a continuous thread type cap, a presson closure, etc.

After the closure is formed it is placed on a rotating chuck (not shown) and a plastisol flows from a nozzle 12 (shown after the flow has stopped) into the gasket-receiving channel 8 to form a gasket 11. In order to permit the plastisol to flow freely, it is thoroughly stirred previous to using and maintained at a temperature of between 90° and 100° F. during use which is sufficient to maintain it in a semi-liquid condition but not sufficient to flux the plastisol. The plastisol is applied until a gasket 11 of the desired thickness and width is provided as shown in FIGS. 3 and 4.

After the plastisol has been flowed into the gasket-receiving channel 8, the closure is conveyed to ovens which heat it to temperatures of between 350° to 390° F. in order to flux the plastisol into a rubber-like sealing gasket and to cause the plastisol gasket 11 to adhere securely to the adhesive solution coating 3 to form a secure bond between the two. The following oven cycles have been found to give good results:

350° F. for 3.5 minutes.
390° F. for 2.0 minutes.

However, other oven cycles may also be used.

As shown in FIG. 3, the primer coating, for example the T-Buff coating, is bonded to the tinplate and the adhesive solution coating is securely adhered to the primer coating. The plastisol gasket is fused to the adhesive solution coating which prevents separation between the inner edge of the plastisol gasket and the adhesive solution coating. It is believed that the plastisol gasket and the adhesive solution coating fuse into a securely bonded integral element which in turn is bonded to the sheet metal of the closure to provide a protective coating over the entire underside of the metal. This coating prevents electrolytic or chemical attack on small portions of the sheet metal and also prevents the inner edge of the plastisol gasket from separating from the closure and forming pockets which would serve to harbor oxygen concentration cells tending to corrode and perforate the closure. The completed closure is shown in FIG. 4 with the coatings described in detail above and separately shown in FIG. 3. The closure may be utilized for sealing containers particularly glass containers to form a hermetic seal and to preserve various types of products in the containers. The containers and the products in them may be sterilized or processed at suitable temperatures and pressures to prevent spoiling.

With some types of products it is desirable to utilize a second coating indicated at 3a in FIG. 5 over the first adhesive coating 3 to form a thicker adhesive coating and to provide greater protection for the metal and for the product. This additional coating is applied and baked in the same manner as the coating 3.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A gasketed metal closure cap having on its inner surface a thin layer of a high molecular weight resin copolymer of vinyl chloride containing at least about 97% vinyl chloride by weight and having good vinyl plastisol adhesion properties, said copolymer layer containing minor proportions of a vinyl resin modifier selected from the group consisting of ketone-formaldehyde resin, phenolic resin, gamma-aminopropyltriethoxysilane, and mixtures of two or more of the foregoing, and a minor proportion of a vinyl polymer stabilized, and a vinyl polymer plastisol gasket bonded to said copolymer layer.

2. A closure cap according to claim 1 in which the vinyl stabilizer comprises an epoxy resin.

3. A closure cap according to claim 1 in which the high molecular weight vinyl resin comprises about 97% by weight polyvinyl chloride and about 3% by weight polyvinyl acetate.

References Cited

UNITED STATES PATENTS

| 3,131,081 | 4/1964 | Husum | 117—75 X |
| 3,136,651 | 6/1964 | Spessard | 117—75 X |
| 3,171,560 | 2/1965 | Desch et al. | 215—40 X |
| 3,233,770 | 2/1966 | Waters | 215—40 |
| 3,257,021 | 6/1966 | Brockett | 215—40 X |
| 3,295,486 | 1/1967 | Simons et al. | 215—40 X |
| 3,344,093 | 9/1967 | Strickman | 215—40 X |

WILLIAM D. MARTIN, Primary Examiner

R. HUSACK, Assistant Examiner

U.S. Cl. X.R.

117—75, 132, 71; 260—836